(12) United States Patent
Kondo

(10) Patent No.: US 9,642,193 B2
(45) Date of Patent: May 2, 2017

(54) LOW-OXYGEN ATMOSPHERE APPARATUS

(71) Applicant: DENSO CORPORATION, Kariya, Aichi-pref. (JP)

(72) Inventor: Yuta Kondo, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 904 days.

(21) Appl. No.: 13/903,303

(22) Filed: May 28, 2013

(65) Prior Publication Data
US 2013/0320001 A1    Dec. 5, 2013

(30) Foreign Application Priority Data
Jun. 4, 2012    (JP) ................. 2012-127194

(51) Int. Cl.
| | | |
|---|---|---|
| H05B 6/64 | (2006.01) | |
| H05B 6/70 | (2006.01) | |
| H05B 6/80 | (2006.01) | |
| B23K 1/002 | (2006.01) | |
| B23K 1/00 | (2006.01) | |
| B23K 1/008 | (2006.01) | |
| B23K 103/10 | (2006.01) | |

(52) U.S. Cl.
CPC ........... *H05B 6/6458* (2013.01); *B23K 1/002* (2013.01); *B23K 1/008* (2013.01); *B23K 1/0012* (2013.01); *H05B 6/6491* (2013.01); *H05B 6/806* (2013.01); *B23K 2203/10* (2013.01); *H05B 2206/044* (2013.01)

(58) Field of Classification Search
CPC ...... B23K 1/0018; B23K 1/005; B23K 1/002; B23K 1/0012; B23K 1/008; B23K 2203/10; H05B 6/80; H05B 6/6458; H05B 6/6491; H05B 6/806; H05B 2206/044

USPC ................ 219/686, 690, 693, 691, 730, 697
See application file for complete search history.

(56) References Cited

U.S. PATENT DOCUMENTS

2002/0056417 A1 * 5/2002 Yonemizu ......... H01L 21/67103
                                                              118/724
2005/0145681 A1    7/2005 Fuse et al.
(Continued)

FOREIGN PATENT DOCUMENTS

| CA | WO 91/05747 A1 * | 5/1991 | ........... B01J 19/126 |
|---|---|---|---|
| JP | A-2-238289 | 9/1990 | |
| JP | H05-500940 A | 2/1993 | |

(Continued)

OTHER PUBLICATIONS

Sep. 27, 2016 Office Action issued in Japanese Patent Application No. 2012-127194.
(Continued)

*Primary Examiner* — Hung D Nguyen
(74) *Attorney, Agent, or Firm* — Oliff PLC

(57) ABSTRACT

A low-oxygen atmosphere apparatus including a chamber which houses an object to be processed, microwave generators, and waveguides through which a microwave generated in the microwave generators is transmitted, and further including, in the chamber and/or the waveguides, oxygen-reducing materials to lower the oxygen concentration of the atmosphere in the chamber, which generates heat by the microwave in order to accelerate a reducing reaction of oxygen, thereby lowering the oxygen concentration of the atmosphere in the chamber.

10 Claims, 4 Drawing Sheets

(56) References Cited

U.S. PATENT DOCUMENTS

2006/0081682 A1    4/2006  Doko et al.
2011/0059574 A1*   3/2011  Miyamoto .......... B05B 15/1222
                                                        438/95

FOREIGN PATENT DOCUMENTS

| JP | A-2004-50223  | 2/2004  |
|----|---------------|---------|
| JP | 2004-358519 A | 12/2004 |
| JP | A-2008-105044 | 5/2008  |

OTHER PUBLICATIONS

Aug. 1, 2016 Office Action issued in Czech Republic Application No. PV 2013-406.
Mar. 29, 2016 Office Action issued in Japanese Application No. 2012-127194.

* cited by examiner

LOW-OXYGEN ATMOSPHERE APPARATUS

TECHNICAL FIELD

The present invention relates to a low-oxygen atmosphere apparatus comprising a low-oxygen atmosphere therein, which is used for, for example, brazing an aluminum product or the like.

BACKGROUND ART

In a brazing apparatus for aluminum products and etc., an atmosphere with a low oxygen concentration is necessary when heating an object to be processed. For realizing such an atmosphere with low oxygen concentration, it has been proposed to keep low the oxygen concentration in a nitrogen atmosphere in a continuous furnace for brazing aluminum products, by contacting an furnace inner wall of a preheating furnace made of a carbonaceous material with oxygen, and reacting the oxygen therewith to change it into CO, wherein when preheating the aluminium products up to about 500° C. in the preheating furnace, heating efficiencies were improved by circulating the nitrogen atmosphere in the preheating furnace by convection using a fan, and the oxygen was introduced into the preheating furnace, and was diffused in the nitrogen atmosphere by the fan (see Japanese unexamined Patent Publication No. 2004-050223).

It has also been proposed to improve qualities thereof by lowering the oxygen concentration using a carbon muffle, i.e., employing a heating zone of the continuous furnace for brazing which has the carbon muffle in the furnace wall, and has a heating chamber in which a furnace atmosphere gas is provided. In other words, it has been proposed to obtain the function of decreasing oxidation of a flux or aluminum products, by arranging as the carbon muffle a graphite outer muffle (i.e., a tunnel-shaped muffle formed with carbon material) having a rectangle cross-section, and forming $CO+CO_2$ in the furnace by the graphite outer muffle (see Japanese unexamined Patent Publication No. 2008-105044).

In addition, as a method of lowering the oxygen concentration in the furnace, it has been proposed to increase the furnace pressure, by filling a non-oxidizing or reducing atmosphere gas in a furnace composed of a plurality of zones, and atmospherically cutting off each zone and the inside and outside of the furnace (see Japanese unexamined Patent Publication No. 2-238289).

When the temperature in the furnace is higher than a predetermined temperature, a reducing reaction of oxygen rapidly proceeds, however, when the temperature in the furnace is lower than the predetermined temperature, the reducing reaction of oxygen does not easily proceed. In addition, when the inside of the furnace is not heated, the reducing reaction, as a matter of course, almost does not proceed. Therefore, when starting-up the furnace, even when there is no object to be processed in the furnace, it is necessary, while heating, to flow a gas such as $N_2$ or Ar into the furnace, and expel the oxygen from the furnace, until the oxygen concentration of the atmosphere in the furnace is lowered to a desired concentration. For example, a brazing furnace takes half a day or more to start-up, i.e., it takes a long time and energy.

Further, in a method of increasing the inner pressure of a furnace divided into a plurality of zones by filling the furnace with a non-oxidizing or reducing atmosphere gas, the productivity is poor, and the cost is high, since the object to be processed is intermittently fed to the furnace.

In the case of a batch furnace, in order to lower the oxygen concentration of the atmosphere in the furnace, it is necessary to depressurize the inside in the furnace to vacuum once, and then substitute the atmosphere thereof with a gas such as $N_2$ or Ar. Therefore, the inside of the furnace needs to be depressurized to vacuum for each batch, and thus the workability of this case is also poor. In addition, the oxygen concentration after lowering the pressure depends on the equipment used, or the oxygen concentration in the gas used, and thus, if a very low oxygen concentration is needed, a highly pure gas, such as Ar or $N_2$, must be used. As a result, the processing cost thereof increases.

SUMMARY OF INVENTIONS

In view of the problems in the conventional art, an object of the present invention is to provide an excellent low-oxygen atmosphere apparatus in which an atmosphere with a low oxygen concentration can be achieved, without elevating the furnace temperature to a predetermined temperature by a heating means. Another object of the present invention is to provide an excellent low-oxygen atmosphere apparatus which does not depend on a structure of the furnace, such as a batchwise or continuous furnace, pump performance during depressurizing the inside thereof to vacuum, and the purity of a gas, such as $N_2$ or Ar, for an inert atmosphere.

A low-oxygen atmosphere apparatus of the present invention is characterized by comprising a chamber (1) which houses an object to be processed, microwave generating means (2, 2'), and waveguides (3, 3') through which a microwave generated in the microwave generating means (2, 2') is transmitted to the chamber, and further comprising oxygen-reducing materials (4, 4') in the chamber (1) and/or the waveguides (3, 3'), in order to lower the oxygen concentration of the atmosphere in the chamber (1), by generating heat using the microwave to accelerate a reducing reaction of oxygen.

In the apparatus, the oxygen-reducing materials (4, 4') are provided in the chamber (1) and/or in the waveguides (3, 3'), and the oxygen-reducing materials are subjected to the microwave to allow the oxygen-reducing materials to generate heat to thereby accelerate the reducing reaction of oxygen ($O_2$) to CO, $CO_2$ or the like, and for example, to thereby achieve a low oxygen atmosphere in the apparatus such that the oxygen concentration of the atmosphere in the apparatus is 10 ppm or less.

As such oxygen-reducing materials, materials having microwave susceptibility are employed. Specific examples of such oxygen-reducing materials (4, 4') include C, Mg, Ca and the like. Among these, C is preferred.

The intensity of a microwave applied to the oxygen-reducing materials (4, 4') can be appropriately selected.

In the low-oxygen atmosphere apparatus, a low oxygen atmosphere can be obtained in the furnace by using a microwave. When the apparatus is used for a heating furnace or the like, without the need of elevating the temperature of the heating furnace to a predetermined temperature by another heating means in order to proceed reducing reaction of the oxygen-reducing material and oxygen, the oxygen-reducing material generates heat by the microwave to proceed the reducing reaction of oxygen and to thereby lower the oxygen concentration. Thus, a low oxygen atmosphere in the apparatus can be achieved by use of a microwave, regardless of whether a heating furnace or the like is running or not running.

DETAILED DESCRIPTION

Figure 1:
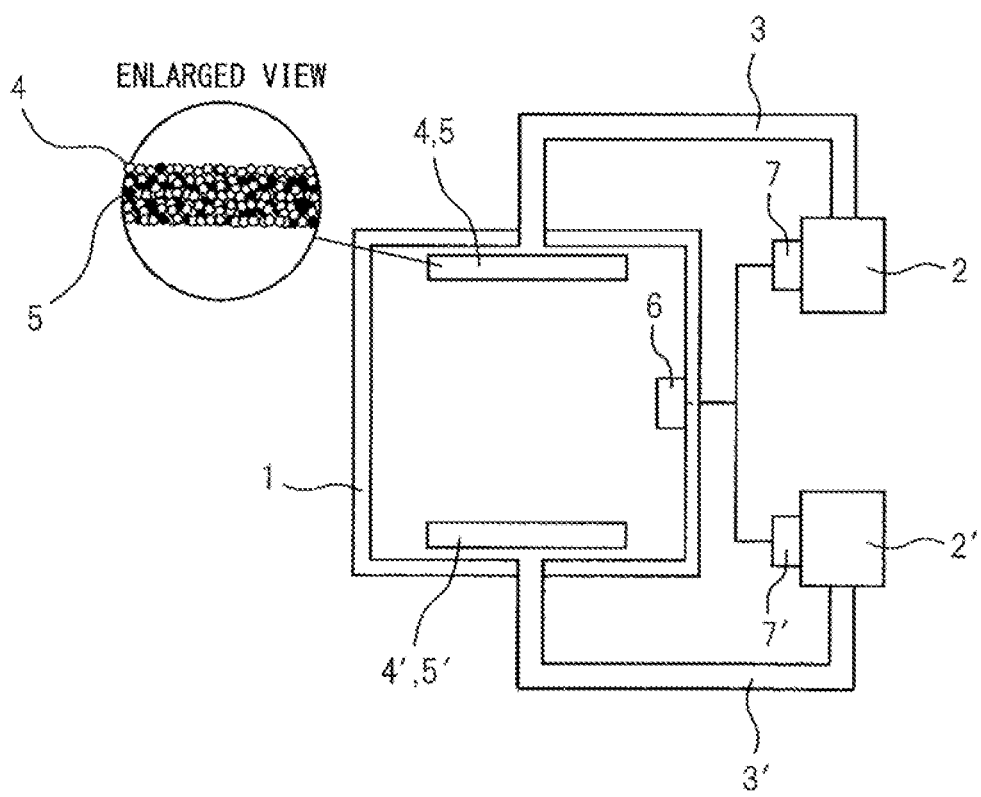
FIG. 1 shows a drawing schematically illustrating an embodiment of a low-oxygen atmosphere apparatus of the present invention, comprising a chamber 1, microwave generating means 2, 2' and waveguides 3, 3', and further comprising, in the chamber, mixtures 4, 5 and 4', 5' of powdery oxygen-reducing materials and powdery microwave absorbers, a means 6 for detecting the oxygen concentration, and means 7 and 7' for controlling the output of microwave.

Examples of a preferred first aspect of the present invention include a low-oxygen atmosphere apparatus, further comprising microwave absorbers (5, 5'), which absorb the microwave, adjacent to the oxygen-reducing materials (4, 4'), in the chamber (1) and/or in the waveguides (3, 3').

As the microwave absorbers (5, 5'), materials is preferred, in which each imaginary part of a complex dielectric constant and a complex magnetic permeability, representing the microwave susceptibility, is large. Each imaginary part of the complex dielectric constant and the complex magnetic permeability thereof can be appropriately selected. Specific examples of such microwave absorbers (5, 5') include C, SiC, $Fe_3O_4$, Si and the like, and C is preferred among them.

The oxygen-reducing materials (4, 4') may be those having small microwave susceptibility. Each imaginary part of the complex dielectric constant and the complex magnetic permeability can be appropriately selected. Specific examples of such oxygen-reducing materials (4, 4') include Al, Mg, Ca, Li and the like. Among these, Ca is preferred.

In such an aspect, when the apparatus is used for a heating furnace or the like, without the need of elevating the temperature of the heating furnace to a predetermined temperature by another heating means for the reducing reaction of oxygen to proceed on an oxygen-reducing material, the oxygen-reducing material generates heat by the microwave to proceed with the reducing reaction of oxygen, and thereby lower the oxygen concentration of the atmosphere.

In the chamber (1) of such an aspect, places where the microwave transmitted through waveguides (3, 3') is effectively applied to the oxygen-reducing materials (4, 4') are preferred, and, for example, vicinities of open ends of the waveguides (3, 3') on a wall of the chamber (1) are particularly preferred. In the waveguides (3, 3'), places inside the waveguides (3, 3') where the electric field strength is large when a material with a large imaginary part of the complex dielectric constant is used as a microwave absorber, and where the magnetic field strength is small when a material with a large complex dielectric constant is used as a microwave absorber, and places where the atmosphere in the chamber (1) can be touched are preferred. In addition, for example, places where piping and waveguides (3, 3') cross, which are on the wall of the chamber (1) and configured such that the atmosphere in the chamber (1) can pass therethrough, are particularly preferred.

As the state in which oxygen-reducing materials (4, 4') are adjacent to microwave absorbers (5, 5'), a state, in which oxygen-reducing materials (4, 4') are in contact with microwave absorbers (5, 5') such that the heat generated by absorbing the microwave on the microwave absorbers (5, 5') easily transfers to the oxygen-reducing materials (4, 4'), is preferred. Specific examples of such a state, in which the oxygen-reducing materials (4, 4') are adjacent to the microwave absorbers (5, 5'), include a state in which a plurality of members which constitute the oxygen-reducing materials (4, 4'), and a plurality of members which constitute the microwave absorbers (5, 5'), are mixed, and both members are at least partially in contact with each other; and a state in which each of oxygen-reducing materials (4, 4') and microwave absorbers (5, 5') is laminar, and they are alternately laminated, and the lamination thereof is configured such that the microwave absorbers (5, 5') are on the side on which microwave is applied.

Examples of one preferred embodiment of the first aspect include a low-oxygen atmosphere apparatus, wherein the affinity of the oxygen-reducing materials (4, 4') to oxygen, and the affinity of the microwave absorbers (5, 5') to oxygen are stronger than the affinity of the object to be processed to oxygen. In such an embodiment, oxygen present in the atmosphere in the chamber (1) does not often attach to an object to be processed to thereby decrease the oxygen concentration in the atmosphere.

Examples of another preferred embodiment of the first aspect include a low-oxygen atmosphere apparatus, wherein the oxygen-reducing materials (4, 4') and the microwave absorbers (5, 5') are powdery or fibrous. In such an embodiment, the powdery or fibrous microwave absorbers (5, 5') absorb microwave to easily generate heat, and the powdery or fibrous oxygen-reducing materials (4, 4') easily cause the reducing reaction of oxygen in the atmosphere.

As the sizes of the powdery or fibrous oxygen-reducing materials (4, 4') and microwave absorbers (5, 5'), the average particle size of the powder when the material is powdery, or the fiber diameter when the material is fibrous, can be appropriately selected.

Examples of such an embodiment include a low-oxygen atmosphere apparatus in which the carbonaceous powdery or fibrous microwave absorbers (5, 5') has an appropriately selected specific surface area. In such an embodiment, a larger specific surface area of oxygen-reducing materials (4, 4') and microwave absorbers (5, 5') makes the microwave absorbers (5, 5') easily generate heat, and makes the oxygen-reducing materials (4, 4') easily cause the reducing reaction of oxygen in the atmosphere.

Examples of another preferred embodiment of the first aspect include a low-oxygen atmosphere apparatus, wherein a powder or fibers which constitute the oxygen- reducing materials (4, 4'), and a powder or fibers which constitute the microwave absorbers (5, 5') are arranged such that they are mixed or in contact with each other. By such an embodiment, the powdery or fibrous microwave absorbers (5, 5') absorb microwave to easily generate heat, and the generated heat easily transfers to the powdery or fibrous oxygen-reducing materials (4, 4'), and the reducing reaction of oxygen is easily proceeded with the powdery or fibrous oxygen-reducing materials (4, 4').

Examples of another preferred embodiment of the first aspect include a low-oxygen atmosphere apparatus, wherein the microwave susceptibility of the object to be processed is lower than the oxygen-reducing materials (4, 4') and the microwave absorbers (5, 5'). In such an embodiment, an object to be processed is less likely to be adversely affected, for example, unnecessarily generates heat, and preferably, an object to be processed is not easily heated.

Examples of a preferred second aspect of the present invention include a low-oxygen atmosphere apparatus, wherein the oxygen-reducing materials (4, 4') also function as a microwave absorber which absorbs the microwave.

In the apparatus, as the oxygen-reducing materials (4, 4'), those having a high microwave susceptibility, i.e., a larger imaginary part of the complex dielectric constant or a larger imaginary part of the complex magnetic permeability, and being capable of also functioning as a microwave absorber which absorbs the microwave, are used. As such an oxygen-reducing material (4, 4'), a material, which easily absorbs the microwave, and in which the imaginary part of each of the complex dielectric constant and the complex magnetic permeability is large, is preferred. In addition, those values can be appropriately selected. Specific examples of such oxygen-reducing materials (4, 4') include SNE6G, SNO-5 manufactured by SEC CARBON, LIMITED, and GR-15, SP-270 manufactured by Nippon Carbon Co., Ltd., and the like. Among these, SNE6G manufactured by SEC CARBON, LIMITED and GR-15 manufactured by Nippon Carbon Co., Ltd. are preferred.

In such an aspect, when the apparatus is used for a heating furnace or the like, without the need to elevate the temperature of the heating furnace to a predetermined temperature by another heating means in order to proceed the reducing reaction of oxygen on an oxygen-reducing material, the oxygen-reducing material generates heat by the microwave to proceed the reducing reaction of oxygen, whereby the oxygen concentration of the atmosphere is lowered, and whereby the structure of the oxygen-reducing material (4, 4') in the apparatus is simple.

Examples of one preferred embodiment of the second aspect include a low-oxygen atmosphere apparatus, wherein the affinity of the oxygen-reducing materials (4, 4') to oxygen is stronger than the affinity of the object to be processed to oxygen. In such an embodiment, oxygen present in the atmosphere in the chamber (1) does not often attach to an object to be processed to thereby decrease the oxygen concentration in the atmosphere.

Examples of another preferred embodiment of the second aspect include a low-oxygen atmosphere apparatus, wherein the oxygen-reducing materials (4, 4') are powdery or fibrous. In such an embodiment, the powdery or fibrous microwave absorbers (5, 5') absorb the microwave to easily generate heat, and the powdery or fibrous oxygen-reducing materials (4, 4') easily cause the reducing reaction of oxygen in the atmosphere.

Examples of another preferred embodiment of the second aspect include a low-oxygen atmosphere apparatus, wherein the microwave susceptibility of the object to be processed is lower than that of the oxygen-reducing materials (4, 4'). In such an embodiment, the object to be processed is less likely to be adversely affected, for example, unnecessarily generates heat, and preferably, the object to be processed is not easily heated.

Examples of a preferred third aspect of the present invention include a low-oxygen atmosphere apparatus, further comprising a means for detecting the oxygen concentration in the chamber (1), wherein the microwave generating means (2, 2') contains a means for controlling the output of microwave, which is configured to control the microwave output by feeding the oxygen concentration detected by the detecting means back to the microwave output control means. In such an aspect, in a state in which the output of microwave in the microwave generating means (2, 2') is optimally controlled, and the microwave generating means is optimally operated, the oxygen- reducing material generates heat by microwave, and the reducing reaction of oxygen thereby lower the oxygen concentration.

The object to be processed (not illustrated) in the present invention is not limited as long as it is processed in a low oxygen atmosphere, and examples thereof include aluminum products for brazing, products processed in a reflow furnace, firing furnace, drying furnace for adhesives, or the like, a heat exchanger and an electronic substrate, and the like. Among these, a heat exchanger, in which brazing has been employed, is suitable.

The chamber (1) which houses the object to be processed of the present invention is not limited, and examples thereof include stainless steel, aluminum, quartz and the like. Among these, stainless steel is suitable.

The microwave generating means (2, 2') in the present invention is not limited, and examples thereof include a magnetron, a klystron, a gyrotron, a semiconductor oscillator and the like. Among these, an inexpensive magnetron is suitable.

Figure 4:
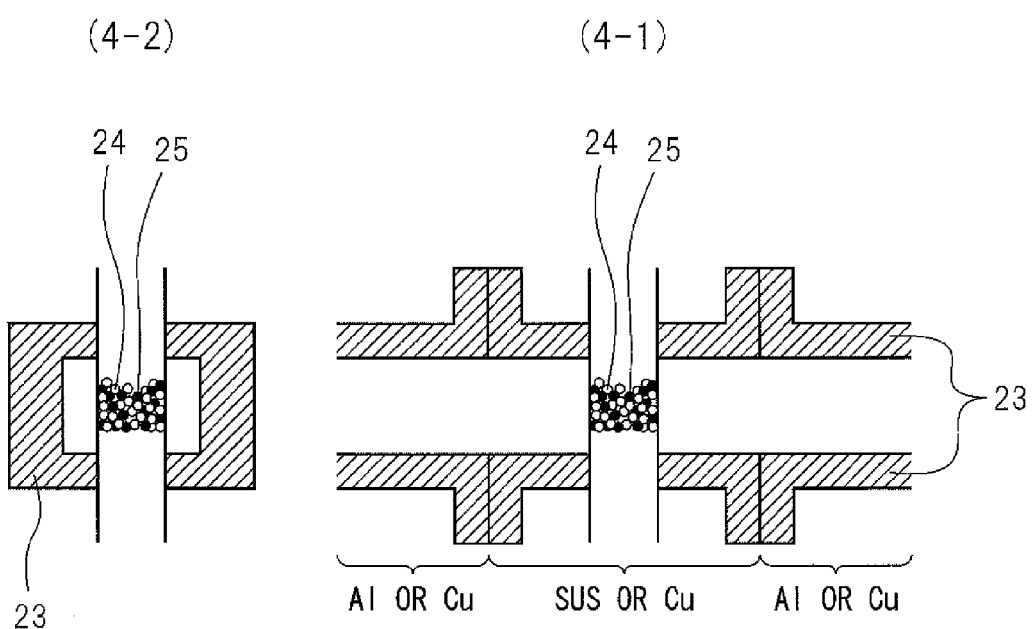
FIG. 4 shows a drawing schematically illustrating an embodiment of a low-oxygen atmosphere apparatus of the present invention, i.e., mixture 24, 25 of powdery oxygen-reducing materials and powdery microwave absorbers positioned between waveguides 23. (4-1) and (4-2) schematically illustrate respectively a side view thereof and a cross-sectional view thereof in a plane perpendicular to the axis of the waveguide 23 at an area where the mixture 24, 25 exists.

The waveguides (3, 3') in the present invention are not limited, and examples thereof include copper, aluminum, stainless steel and the like. Among these, stainless steel (see FIG. 4) is suitable. As shown in FIG. 4, waveguides (23) positioned such that they sandwich the mixture (24, 25) of powdery oxygen-reducing materials and powdery microwave absorbers are constituted by connecting a pipe made of aluminum or copper, and a pipe made of stainless steel or copper, via a flange unit.

The atmosphere in the chamber (1) in the present invention is not limited, and examples of the atmosphere before a low-oxygen concentration processing include an inert atmosphere such as nitrogen ($N_2$) having a relatively high oxygen ($O_2$) concentration.

In addition, the means (not illustrated) for detecting the oxygen concentration in the above-mentioned third aspect of the present invention is not limited, and examples thereof include a quadrupole mass spectrometer, a zirconia-type oxygen concentration meter a fuel cell-type oximeter and the like. Among these, a fuel cell-type oximeter is suitable.

The "oxygen concentration" is measured by a fuel cell-type oximeter, the "affinity to oxygen" is calculated by standard free energy of formation of each oxide, the "specific surface area" is measured by a BET method, the each imaginary part of the complex dielectric constant and the complex magnetic permeability representing the "microwave susceptibility" is measured by a waveguide method, a free space method, a resonator method or the like.

Further, the "intensity of microwave" is measured by a power meter, the "particle size of powder" is measured by a laser diffractometry, and the "temperature of a mixture 14, 15 of oxygen-reducing materials and microwave absorbers" is measured by a thermocouple or a radiation thermometer.

EXAMPLES

The embodiment which embodies the low-oxygen atmosphere apparatus of the present invention will be described with reference to the Drawings. The reference numeral described in the above-mentioned parentheses is one example of the correspondence relationship between Brief Description of the Drawings and the concrete description in the below-described embodiments.

Example 1

FIG. 1 illustrates one embodiment of the low-oxygen atmosphere apparatus of the present invention, which is a low-oxygen atmosphere apparatus for brazing aluminum products. In other words, FIG. 1 schematically illustrates an apparatus comprising: a chamber 1 which houses an object to be processed (not illustrated), i.e., a heat exchanger to be brazed; microwave generating means 2, 2' which are microwave transmitters; waveguides 3, 3' for transmitting microwave, which are arranged such that the chamber 1 and the microwave generating means 2, 2' are connected; and further comprising, in the camber 1, mixtures 4, 5 and 4', 5' of oxygen-reducing materials having an average particle size of 5 μm and a specific surface area of 28 m$^2$/g, which are powdery SNE6G, and microwave absorbers having an average particle size of 5 μm, which are SiC. In addition, FIG. 1 illustrates, in combination therewith, as an enlarged drawing of the mixture 4, 5 of the powdery oxygen-reducing materials and the powdery microwave absorbers, a state in which such powdery oxygen-reducing materials 4 and powdery microwave absorbers 5 are mixed, and in contact with each other.

In the low-oxygen atmosphere apparatus as shown in FIG. 1, nitrogen ($N_2$) with the $O_2$ concentration of 500 ppm was enclosed in the chamber 1 housing a heat exchanger to be brazed, and then the mixtures 4, 5 and 4', 5' of oxygen-reducing materials and microwave absorbers were irradiated, maintaining room temperature (25° C.), with a microwave having a predetermined intensity from the microwave generating means 2, 2', i.e., a microwave transmitter, via waveguides 3, 3' for a predetermined time to thereby allow the mixtures 4, 5 and 4', 5' to absorb the microwave and generate heat to elevate the temperature of the mixtures to 600° C., as well as accelerating the reducing reaction of oxygen therein, and resulting in decreasing the oxygen concentration of the atmosphere in the chamber 1 to 5 ppm.

Example 2

Figure 2:
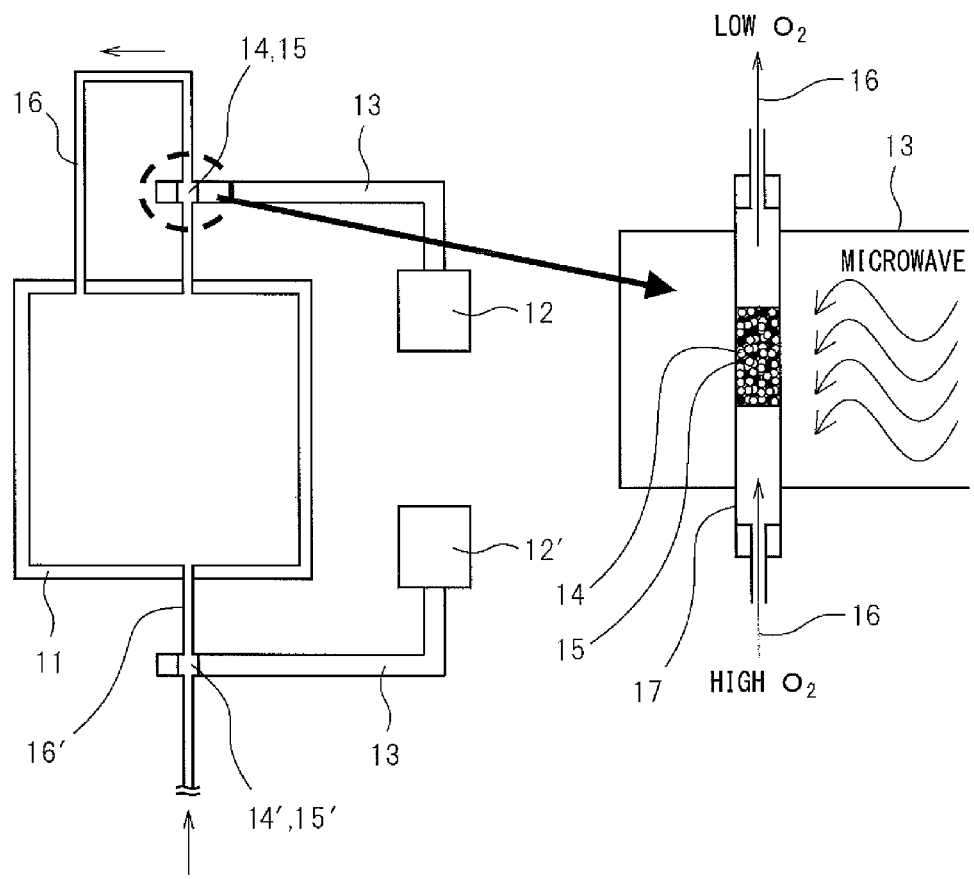
FIG. 2 shows a drawing schematically illustrating an embodiment of a low-oxygen atmosphere apparatus of the present invention, comprising a chamber 11, microwave generating means 12, 12', waveguides 13, 13', and mixtures 14, 15 and 14', 15' of powdery oxygen-reducing materials and powdery microwave absorbers, positioned at portions where waveguides 13, 13' and pipings 16, 16' cross respectively.

FIG. 2 illustrates another embodiment of the low-oxygen atmosphere apparatus of the present invention which is a low-oxygen atmosphere apparatus for brazing aluminum products or the like. In other words, FIG. 2 schematically illustrates an apparatus comprising: a chamber 11 housing an object to be processed (not illustrated), i.e., a heat exchanger to be brazed; microwave generating means 12, 12' which are microwave transmitters; waveguides 3, 3' for transmitting a microwave, which are arranged such that the chamber 11 and the microwave generating means 12, 12' are connected; and a piping 16 for circulating the atmosphere in the chamber 11, and a piping 16' for introducing a nitrogen gas into the chamber 11; and further comprising, in a portion where a waveguide 13 and the piping 16 cross, mixtures 14, 15 and 14', 15' of oxygen-reducing materials, which are powdery SNE-6G(C), having an average particle size of 5 μm and a specific surface area of 28 m$^2$/g, and microwave absorbers, which are powdery SNE-6G(C), having an average particle size of 5 μm and a specific surface area of 28 m$^2$/g (namely, the oxygen-reducing materials (14, 14') also function as the microwave absorbers (15, 15')). In addition, the piping 16 is provided with a pumping means (not illustrated) for circulating the atmosphere in the chamber 11. FIG. 2 also illustrates, along with a scale, as an enlarged drawing of the mixture 14, 15 of the powdery oxygen-reducing materials and the powdery microwave absorbers, a state in which such powdery oxygen-reducing materials 14 and powdery microwave absorbers 15 were mixed and in contact with each other, and in which a portion which is inserted and fixed in a glass pipe 17, being a part of the piping 16, is positioned in the waveguide 13.

In the low-oxygen atmosphere apparatus as shown in FIG. 2, while introducing nitrogen ($N_2$) with an $O_2$ concentration of 500 ppm from the piping 16 into the chamber 1 which housed a heat exchanger to be brazed, and while circulating nitrogen gas in piping 16 by a circulation pump (not shown), and maintaining room temperature (25° C.), the mixtures 14, 15 and 14', 15' of oxygen-reducing materials and microwave absorbers, which were positioned at a portion where the waveguide 13 and the piping 16 crossed, were irradiated with a microwave having a predetermined intensity from the microwave generating means 12, 12', which were microwave transmitters, via waveguides 13, 13' for a predetermined time to thereby allow the mixtures 4, 5 and 4', 5' to absorb the microwave and generate heat to elevate the temperature to 750° C., as well as accelerating the reducing reaction of oxygen therein, and resulting in decreasing the oxygen concentration of the atmosphere in the chamber 11 to 1 ppm. At the mixture 14, 15 of the oxygen-reducing materials and the microwave absorbers, the oxygen concentration of the circulating atmosphere was decreased; and at the mixture 14', 15' of the oxygen-reducing materials and the microwave absorbers, the oxygen concentration of the introduced nitrogen gas was decreased. In addition, a surplus atmosphere gas in the chamber 11 was appropriately exhausted from an exhaust pipe (not illustrated).

Figure 3:
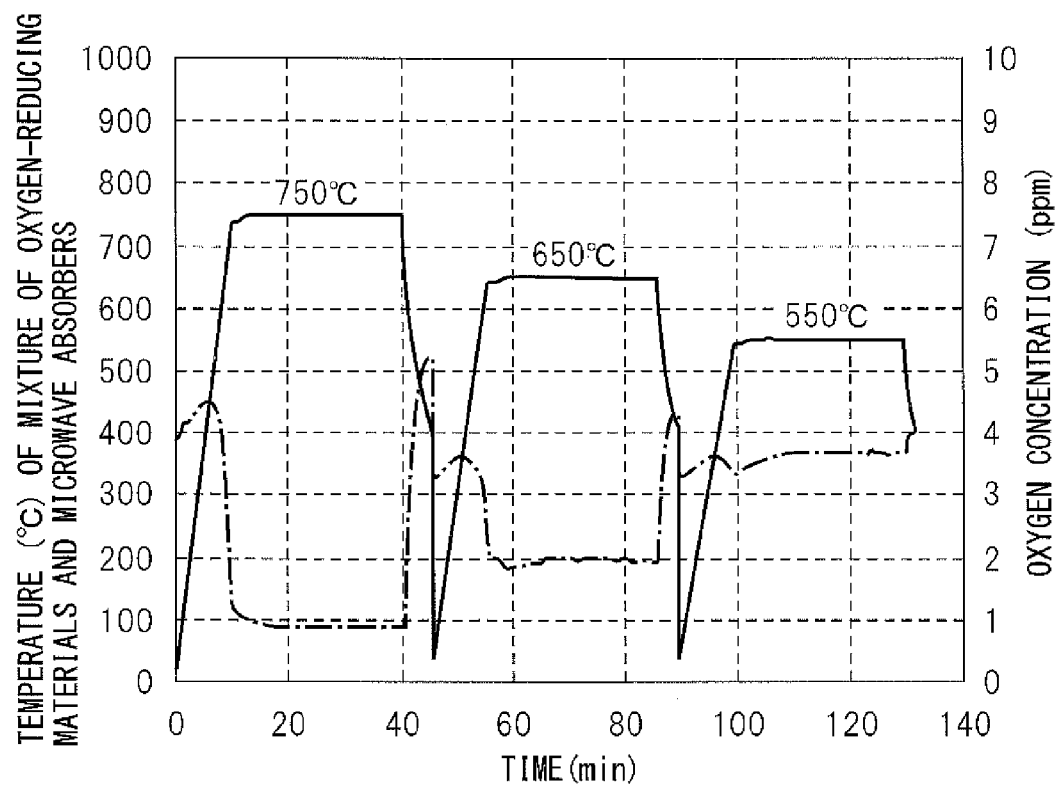
FIG. 3 shows a drawing illustrating, in an embodiment illustrated in FIG. 2 of a low-oxygen atmosphere apparatus of the present invention, changes with the passage of time of the temperature of mixtures 14, 15 of the powdery oxygen-reducing materials and powdery microwave absorbers, positioned at a portion where a waveguide 13 and the piping 16 cross, and the oxygen concentration of the gas in a piping 16 which has passed through the mixture 14, 15 of the oxygen-reducing materials and microwave absorbers, when the temperature of the mixture 14, 15 of the oxygen-reducing materials and microwave absorbers is changed by preheating the atmosphere in the chamber 11 by using an external heating means.

FIG. 3 illustrates changes with the passage of time of the temperature of the mixture 14, 15 of the powdery oxygen-reducing materials and the powdery microwave absorbers, positioned at a portion where the waveguide 13 and the piping 16 cross, and the oxygen concentration of the gas in the piping 16 which has passed through the mixture 14, 15 of the oxygen-reducing materials and microwave absorbers, when the temperature of the mixture 14, 15 of the oxygen-reducing materials and microwave absorbers is changed by preheating the atmosphere in the chamber 11 by using an external heating means, in the embodiment of a low-oxygen atmosphere apparatus of the present invention represented by FIG. 2.

As illustrated in FIG. 3, the higher the temperature of the mixture 14, 15 of the oxygen-reducing materials and the microwave absorbers, the lower the oxygen concentration of the gas which has passed therethrough. In addition, even when the temperature of the mixture 14, 15 of the oxygen-reducing materials and the microwave absorbers was 550° C., the oxygen concentration of the gas which had passed therethrough was less than 4 ppm, and thus the effect of lowering the oxygen concentration was sufficiently recognized.

We claim:

1. A low-oxygen atmosphere apparatus comprising:
   a chamber which houses an object to be process,
   microwave generating means,
   waveguides through which a microwave generated in the microwave generating means is transmitted to the chamber,
   oxygen-reducing materials in the chamber and/or the waveguides, in order to lower the oxygen concentration of the atmosphere in the chamber, by generating heat using the microwave to accelerate a reducing reaction of oxygen, and
   a detecting means configured for detecting the oxygen concentration in the chamber,
   wherein the microwave generating means contain a microwave output control means configured for controlling microwave output, the microwave output control means being configured to control the microwave output by feeding the oxygen concentration detected by the detecting means back to the microwave output control means.

2. The low-oxygen atmosphere apparatus according to claim 1, further comprising microwave absorbers, which absorb the microwave, adjacent to the oxygen-reducing materials in the chamber and/or in the waveguides.

3. The low-oxygen atmosphere apparatus according to claim 2, wherein an affinity of the oxygen-reducing materials to oxygen, and an affinity of the microwave absorbers to oxygen are stronger than an affinity of the object to be processed to oxygen.

4. The low-oxygen atmosphere apparatus according to claim 2, wherein the oxygen-reducing materials and the microwave absorbers are powdery or fibrous.

5. The low-oxygen atmosphere apparatus according to claim 4, wherein a powder or fibers which constitute the oxygen-reducing materials, and a powder or fibers which constitute the microwave absorbers are arranged such that they are mixed or in contact with each other.

6. The low-oxygen atmosphere apparatus according to claim 2, wherein microwave susceptibility of the object to be processed is lower than those of the oxygen-reducing materials and the microwave absorbers.

7. The low-oxygen atmosphere apparatus according to claim 1, wherein the oxygen-reducing materials also function as a microwave absorber which absorbs the microwave.

8. The low-oxygen atmosphere apparatus according to claim 7, wherein the affinity of the oxygen-reducing materials to oxygen is stronger than the affinity of the object to be processed to oxygen.

9. The low-oxygen atmosphere apparatus according to claim 7, wherein the oxygen-reducing materials are powdery or fibrous.

10. The low-oxygen atmosphere apparatus according to claim 7, wherein the microwave susceptibility of the object to be processed is lower than that of the oxygen-reducing materials.

* * * * *